(12) United States Patent
Yamaguchi et al.

(10) Patent No.: US 6,488,608 B2
(45) Date of Patent: Dec. 3, 2002

(54) HYBRID VEHICLE

(75) Inventors: Koichi Yamaguchi, Hino (JP); Atsuomi Obata, Hino (JP); Atsushi Masuda, Hino (JP)

(73) Assignee: Hino Jidousha Kabushiki Kaisha, Tokyo (JP)

( * ) Notice: Subject to any disclaimer, the term of this patent is extended or adjusted under 35 U.S.C. 154(b) by 4 days.

(21) Appl. No.: 09/766,571

(22) Filed: Jan. 23, 2001

(65) Prior Publication Data

US 2001/0011050 A1 Aug. 2, 2001

(30) Foreign Application Priority Data

Jan. 24, 2000 (JP) ........................................ 2000-014715
Jan. 26, 2000 (JP) ........................................ 2000-017324

(51) Int. Cl.[7] .......................... B60R 1/02; B60R 41/02; B60R 1/00; B60R 6/00; B60R 16/00
(52) U.S. Cl. ..................... 477/3; 477/5; 477/6; 477/8; 180/65.2; 180/65.3; 180/65.7
(58) Field of Search .................. 477/3, 5, 6, 8; 180/65.2, 65.3, 65.7

(56) References Cited

U.S. PATENT DOCUMENTS

| | | | | |
|---|---|---|---|---|
| 4,305,254 A | * | 12/1981 | Kawakatsu et al. | ........... 60/716 |
| 4,407,132 A | * | 10/1983 | Kawakatsu et al. | ........... 60/716 |
| 5,433,282 A | * | 7/1995 | Moroto et al. | ............. 180/65.2 |
| 5,482,512 A | * | 1/1996 | Stevenson | ....................... 475/5 |
| 5,788,006 A | * | 8/1998 | Yamaguchi | ................ 180/65.2 |
| 5,935,040 A | | 8/1999 | Tabata et al. | ................... 477/3 |

FOREIGN PATENT DOCUMENTS

| | | |
|---|---|---|
| DE | 29 43 554 | 5/1981 |
| DE | 198 18 108 A1 | 11/1998 |
| EP | 0 724 978 A1 | 8/1996 |
| JP | 11-75302 | 3/1999 |

* cited by examiner

*Primary Examiner*—Sherry Estremsky
*Assistant Examiner*—Tisha D. Lewis
(74) *Attorney, Agent, or Firm*—Pillsbury Winthrop LLP

(57) ABSTRACT

A hybrid car, which can utilize the merits of both the series system hybrid car and the parallel system hybrid car and has high fuel consumption efficiency, is provided. Only one electric rotary machine is mounted in order to reduce the total weight of the car. By eliminating energy to be lost by friction of an internal combustion engine during regenerative braking, energy efficiency regenerated by the regenerative braking is improved. The internal combustion engine, a motor-generator, a clutch and a change gear are connected in the sequence and a unidirectional rotation transmitting means is provided between the internal combustion engine and the motor-generator.

4 Claims, 13 Drawing Sheets

US 6,488,608 B2

HYBRID VEHICLE

CROSS REFERENCE TO RELATED APPLICATIONS

The present invention claims priority from Japanese Patent Applications No. 2000-014715 filed Jan. 24, 2000 and No. 2000-017324 filed Jan. 26, 2000, the contents of which are incorporated herein by reference.

BACKGROUND OF THE INVENTION

1. Field of the Invention

The present invention relates to a hybrid car using both an internal combustion engine and a motor-generator and, particularly, the present invention relates to a novel hybrid car capable of realizing a series-parallel hybrid system, which utilizes a single electric rotary machine and has small fuel consumption.

2. Description of Related Art

The hybrid car having an internal combustion engine and a motor-generator can be roughly classified to a series system and a parallel system on the basis of driving system.

In the hybrid car of the series system, an internal combustion engine is mechanically connected such that the internal combustion engine drives a generator and an axle of the car is mechanically connected such that the axle is driven by a motor. That is, the car is driven by the motor supplied with electric energy generated by the generator driven by the internal combustion engine. In the series system, it is usual that the electric energy supplied from the generator is used to recharge a storage battery and the motor is driven by the storage battery. When braking energy is regenerated in the series system, the motor ganged with the axle is switched to a generator mode and rotary energy supplied from the axle is converted into electric energy with which the storage battery is recharged. Fuel (gasoline, etc.) used in the internal combustion engine is externally supplied and the storage battery may be recharged by externally supplying recharging current thereto.

The parallel system is constructed by mechanically connecting a motor-generator directly to an internal combustion engine driving an axle. By using the motor-generator as a motor and supplying electric energy from a storage battery to the motor, it is possible to drive the axle by both the internal combustion engine and the motor. In braking the car, it is possible to perform a regenerative braking for recharging the storage battery by operating the motor-generator as a generator. Further, it is possible to recharge the storage battery with electric energy generated by the motor-generator during a parking time of the car by shifting a change gear to neutral or decoupling a clutch to switch the operating mode of the motor-generator to the generator mode, driving the motor-generator operating as the generator by the internal combustion engine and supplying an electric output of the motor-generator to the storage battery. Alternatively, it is possible to recharge the storage battery by operating the motor-generator as the generator during a running state of the car with the change gear and the clutch being connected and driving both the axle and the generator by the internal combustion engine. Fuel for the internal combustion engine is supplied externally and the storage battery can be recharged by supplying recharging current externally. This system has been utilized in HIMR's manufactured and sold by the assignee of this application.

The series system allows a car to be operated by selectively setting the rotation speed of an internal combustion engine regardless of the running state of the car. That is, in the case where the recharging of the storage battery is performed during either the running state or the parking state of the car, it is possible, according to the load current and the recharging state of the storage battery, to control the operation of the internal combustion engine such that rotation speed thereof becomes in a range within which fuel efficiency is high or in a range within which the amount of exhaust gas becomes minimum.

On the contrary, since the parallel system can operate both the internal combustion engine and the motor, it is possible to increase the maximum torque generated in running on an uphill road or in starting with acceleration. However, since the rotation speed of internal combustion engine is generally changed correspondingly to the running condition of the car, it is impossible to continuously drive the car at rotation speed or speeds in the range in which fuel efficiency is high. Therefore, the parallel system is considered as to be suitable for a large size vehicle such as a bus or truck which requires a large instantaneous maximum torque.

A system which utilizes the merits of both the series system and the parallel system is disclosed in JP H11-75302 A filed by the present assignee. A construction of the system is shown in FIG. 1. In FIG. 1, a vehicle of the system uses first motor-generator 2a and second motor-generator 2b. First motor-generator 2a is directly connected to internal combustion engine 1 and first clutch 3a is provided between first motor-generator 2a and change gear 4. second motor-generator 2b is connected to the change gear side of first clutch 3a through second clutch 3b. Second motor-generator 2b is connected to a main shaft through gear train 4a provided on an input side of change gear 4.

In this construction, since, when first clutch 3a is separated, rotation of internal combustion engine 1 is not transmitted to change gear 4, internal combustion engine 1 drives first motor-generator 2a as a generator to recharge a storage battery and the vehicle is driven with energy supplied from second motor-generator 2b and the storage battery by operating second motor-generator 2b as a motor and connecting second clutch 3b. In this operation mode, the system becomes the series system mentioned above. Since, when first clutch 3a is connected in this operation mode, the vehicle can be driven directly by internal combustion engine 1 and first motor-generator 2a can be utilized as the motor simultaneously, this system becomes the parallel system mentioned above. When this system is operated as the series system, it is possible to selectively set an engine rotation in an efficient rotation speed range to thereby improve the fuel consumption and, when this system is operated as the parallel system, it is possible to increase the instantaneous torque. In the system shown in FIG. 1, when the regenerative braking is performed, it is possible to effectively regenerate braking energy from second motor-generator 2b by separating first clutch 3a, without influence of friction of internal combustion engine 1. However, it is necessary, in this system, to control the two clutches, as mentioned.

German Patent Publication No. 2943554 (Volkswagen) discloses a technique, which belongs to the above mentioned parallel system and in which an internal combustion engine, a motor-generator, a first clutch and a change gear are connected in the sequence and a second clutch is provided between the internal combustion engine and the motor-generator. That is, the disclosed construction allows a vehicle to be operated as either the parallel system or a modified series system with using a single electric rotary machine. In the disclosed system, however, it is necessary to provide the second clutch, which is large in size, and to operate the large clutch correspondingly to the operation mode. Therefore, a special clutch mechanism using an oil pressure system and an electronic device for controlling the clutch mechanism are indispensable.

Demand for hybrid car, particularly, hybrid cars having high fuel efficiency, is very brisk in the recent market. Further, there is a severe demand for hybrid car having high exhaust gas purification performance looking far ahead into the future. Under the circumstances, it becomes necessary to study the possibility of employment of the above mentioned series system in a large commercial vehicle such as a bus and/or truck. In the series system mentioned above, a vehicle can be driven by electric energy obtained from a generator driven an internal combustion engine, in which case, the rotation speed of the internal combustion engine is basically in no relation to the running speed of the vehicle. Therefore, it is possible, in the series system, that the internal combustion engine can utilize a rotation speed in a range preferable in view of the fuel consumption characteristics and the exhaust gas characteristics thereof.

In the series system, however, two electric rotary machines are required basically. Since the size of electric rotary machine for the large vehicle such as truck and/or bus becomes large necessarily, the necessity of two large electric rotary machines on the vehicle causes the weight of the vehicle to be increased in contradiction to the basic object to improve the fuel efficiency.

In the parallel system, in order to improve the fuel efficiency, a testing of improvement of the utilization efficiency of regenerated energy by improving the efficiency of regenerative braking using the motor-generator as the generator during deceleration of the vehicle has been performed. In the parallel system, however, energy to be obtained by braking is consumed as heat generated by friction of the internal combustion engine, that is, radiated as heat generated by engine-brake, so long as the motor-generator is directly connected to the rotary shaft of the internal combustion engine. Therefore, the regenerated energy can not be effectively utilized as electric energy. In order to avoid this problem, the second clutch is required in the system shown in FIG. 9. In the Volkswagen system mentioned above in which the second clutch is provided between the internal combustion engine and the motor-generator, it is possible, during the regenerative braking, to separate the second clutch such that regenerative braking is not influenced by friction of the internal combustion engine. However, it is necessary, in order to control the second clutch with an appropriate timing, to provide a complicated mechanical device including a large size oil pressure system and an electric mechanism including a number of sensors and program control circuits.

SUMMARY OF THE INVENTION

The present invention was made in view of the above mentioned background and has an object to provide a hybrid car having a structure suitable for a large size vehicle and capable of utilizing the merits of both the series system and the parallel system.

Another object of the present invention is to provide a hybrid car, which can generate a large torque by driving an axle of the car with an internal combustion engine and a motor in running along an uphill road or in starting and can substantially improve the fuel efficiency.

Another object of the present invention is to provide a hybrid car, which mounts a single electric rotary machine and is lightweight.

A further object of the present invention is to provide a hybrid car capable of effectively regenerating energy by braking without influence of friction of an internal combustion engine.

Another object of the present invention is to provide a hybrid car having a simplified construction without necessity of providing a second clutch, which is complicated in structure, is heavy and is large in size.

According to the present invention, these objects can be achieved by a hybrid car featured by that an internal combustion engine is connected to a motor-generator not directly but through a unidirectional rotation transmitting means.

That is, the present hybrid car including the internal combustion engine, the motor-generator, a clutch and a change gear, all of which are connected in the sequence such that a rotary driving force is transmitted in the sequence, is featured by that the unidirectional rotation transmitting means, which can transmit a rotary driving force only from the internal combustion engine to the motor-generator, is provided between the internal combustion engine and the motor-generator.

The simplest example of the unidirectional rotation transmitting means may be a rotary ratchet mechanism provided on a rear wheel shaft of a bicycle. The direction of rotation of the internal combustion engine is always constant and is never reversed. The unidirectional rotation transmitting means becomes in a coupling state automatically when the rotation speed of the internal combustion engine becomes higher than that of the motor-generator and becomes in a decoupling or slipping state automatically when the rotation speed of the internal combustion engine becomes lower than that of the motor-generator. In the coupling state, the rotary drive force is transmitted from the internal combustion engine to the motor-generator. When the motor-generator starts to drive the internal combustion engine, the rotation transmitting means becomes the decoupling state, so that the rotary drive force is not transmitted in that direction.

The unidirectional rotation transmitting means may be constructed with any of various known mechanisms based on similar principles to that of the rotary ratchet mechanism. Such mechanisms may be utilized by modifying the designs thereof such that they become suitable for a device for driving large size vehicles.

The present inventors had manufactured and tested a unidirectional clutch as the unidirectional rotation transmitting means. The unidirectional clutch has a structure applicable to a commercial vehicle such as a large size bus and/or large size truck and will be described later.

By utilizing such unidirectional rotation transmitting means, rotation of wheels of a vehicle is transmitted to a motor-generator through a change gear and a clutch when an internal combustion engine becomes an idling state or a low rotation speed state by releasing an accelerator pedal while the vehicle is running at a certain speed. If a braking is performed in this case, it is possible to perform a regenerative braking by operating the motor-generator as a generator. In such case, since a connection between the internal combustion engine and the motor-generator is separated by racing of the unidirectional rotation transmitting means, it is possible to efficiently regenerate mechanical energy generated by the braking by the motor-generator, without any loss of rotation energy due to friction of the internal combustion engine.

When the accelerator pedal is pressed down in a state where the motor-generator operates as the motor by the unidirectional rotation transmitting means and the vehicle is accelerated by electric energy, the rotation speed of the internal combustion engine is increased. Therefore, the unidirectional rotation transmitting means becomes in the coupling state, so that the rotary drive force is transmitted from the internal combustion engine to the drive axle. Therefore, it becomes possible to drive the vehicle by the motor and the internal combustion engine simultaneously to thereby obtain large torque necessary in a short time such as when the vehicle runs an uphill road or starts to run.

When the vehicle makes a backward movement, the unidirectional rotation transmitting means works similarly. That is, since the change gear is in the reverse position when the vehicle is to be moved backward, the motor-generator never rotate in a reverse direction even if the vehicle moves backward. This is different from the case of the ratchet on the bicycle.

The hybrid car according to the present invention comprises control means for controlling the motor-generator and electric storage means connected to the motor-generator through the control means, wherein the control means comprises means for setting any one of the following modes:

(1) a motor running mode in which the motor-generator is operated as the motor to drive the axle through the change gear;

(2) a parallel running mode in which the motor-generator is operated as the motor and the axle is driven by both the motor and the internal combustion engine through the change gear;

(3) an engine running mode in which the motor-generator races and the axle is driven by the internal combustion engine through the change gear;

(4) a running/recharging mode in which the motor-generator is operated as a generator and the axle is driven by the internal combustion engine through the motor-generator and the change gear and, simultaneously, the electric storage means is recharged by electric energy generated by the generator;

(5) a regenerative mode in which the motor-generator is operated as the generator and the generator is driven by the change gear to recharge the electric storage means by electric energy generated by the generator; and (6) a parking/recharging mode in which the motor-generator is operated as the generator and the generator is driven by the internal combustion engine to recharge the electric storage means by electric energy generated by the generator.

Further, the motor-generator of the hybrid car according to the present invention is preferably a synchronous rotary machine including a permanent magnet. In such case, the control means may include a bidirectional inverter for converting a multi-phase A.C. output of the synchronous rotary machine into a D.C. current and supplying the D.C. current to the electric storage means and for converting an output D.C. current of the electric storage means into a multi-phase A.C. output and supplying the multi-phase A.C. output to the synchronous rotary machine, a first rotation sensor for detecting rotation of the motor-generator, a second rotation sensor for detecting rotation of the internal combustion engine and a program control circuit responsive to outputs of these two rotation sensors for monitoring an operation of the unidirectional rotation transmitting means and controlling the A.C. frequency of the inverter.

The hybrid car according to the present invention may have a construction in which a residual capacity of the electric storage means is monitored and taken in the control means to select and set an appropriate operation mode.

When the electric storage means is a large capacitor, it is possible to monitor the residual capacity by monitoring a terminal voltage thereof. When the electric storage means is a chemical storage battery having a simple construction, it may be preferable to estimate the residual capacity by utilizing a terminal voltage thereof Techniques for monitoring the residual capacity of the electric storage means in more detail by monitoring temperature and/or specific gravity of solution have been known and can be utilized.

For using a unidirectional clutch as the unidirectional rotation transmitting means, it is preferable to arrange a unidirectional clutch in an inside space of a rotor of a motor-generator. The basic structure and operation of the unidirectional clutch are the same as those of a rotary ratchet mechanism mounted on a rear wheel of a bicycle and includes an outer ring, an inner ring and sprags for coupling the outer and inner rings. The outer ring is connected to a crank shaft of an internal combustion engine and the inner ring is coupled in the inside space of the rotor of the motor-generator.

That is, the unidirectional clutch is disposed in a space provided in inside of a rotor of the motor-generator and a stator of the motor-generator is disposed in an outer peripheral space of the rotor. With this structure, length of the rotary shaft measured from the crank shaft of the internal combustion up to the change gear is not increased substantially by the provision of the unidirectional clutch.

BRIEF DESCRIPTION OF THE DRAWINGS

Specific embodiments of the present invention will now be described, by way of example only, with reference to the accompanying of drawings in which.

DETAILED DESCRIPTION OF THE PREFERRED EMBODIMENTS

Figure 2:
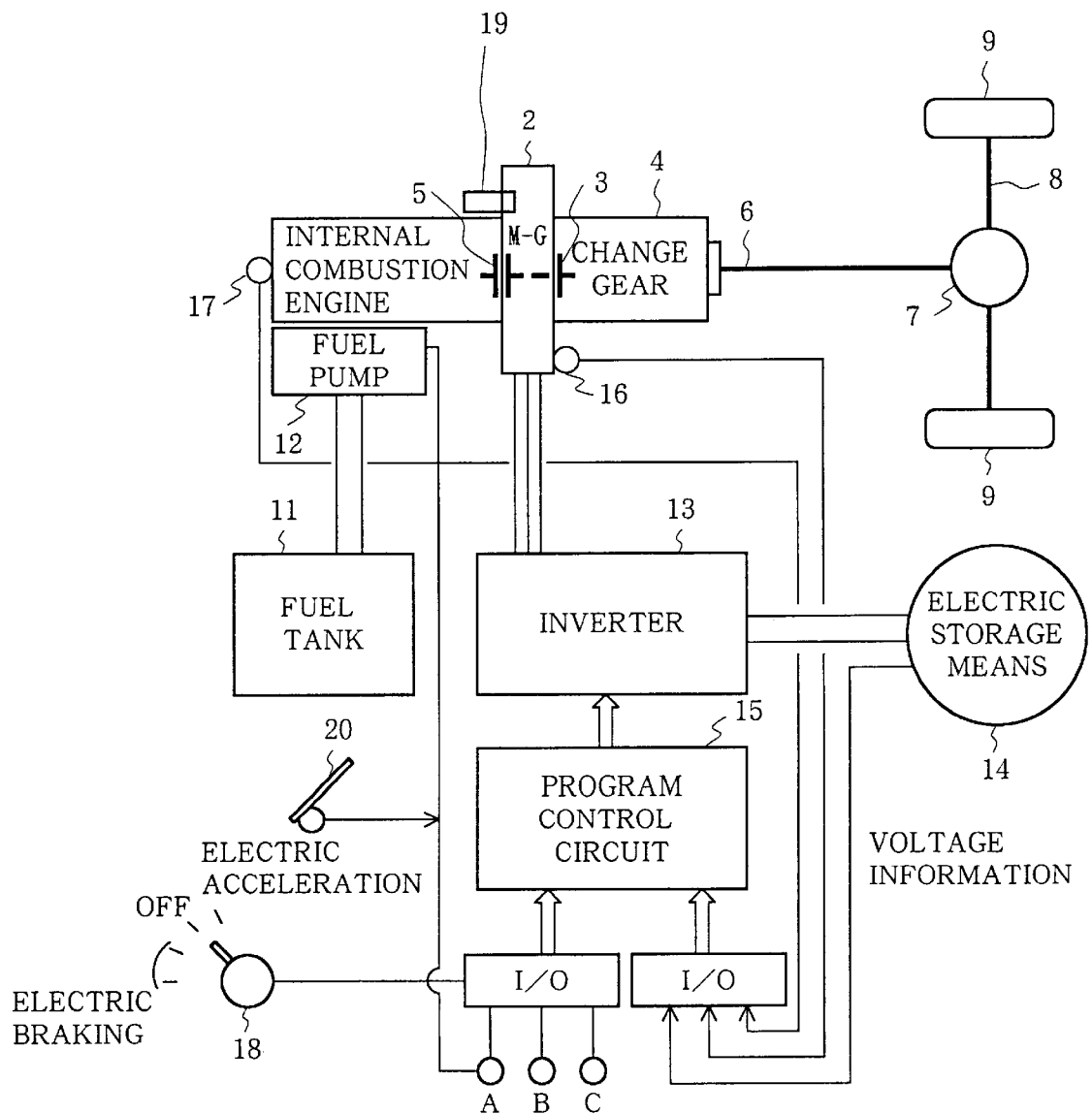
FIG. 2 is a block diagram of a whole construction of a hybrid car according to an embodiment of the present invention.

FIG. 2 is a block diagram of a whole construction of a hybrid car according to an embodiment of the present invention. This hybrid car includes internal combustion 1, motor-generator 2, clutch 3 and change gear 4, which are connected in series in the order through a rotary drive shaft. An output shaft of change gear 4 is connected to drive wheels 9 through propeller shaft 6, differential gear 7 and axle 8. The present invention is featured by that unidirectional rotation transmitting means 5 is provided between internal combustion engine 1 and motor-generator 2, which functions to allow a rotary drive force to be transmitted in only one direction from internal combustion engine 1 to motor-generator 2.

In this construction of the present invention, a coupling operation of unidirectional rotation transmitting means 5 is not controlled externally. That is, unidirectional rotation transmitting means 5 becomes the coupling state automatically when the rotation speed of internal combustion engine 1 is larger relative to the rotation speed of motor-generator 2 and becomes the racing or slipping state automatically when the rotation speed of internal combustion engine 1 becomes smaller relative to the rotation speed of the motor-generator. This is similar to the relation between the rotation of a rear wheel of a bicycle and the rotation of the pedals thereof and can be understood sensuously by imaging the state in which a rider presses the pedals for acceleration and the state in which the rider makes the pedals stationary during a running of the bicycle.

Internal combustion engine 1 is supplied with liquid fuel from fuel tank 11 through fuel pump 12. In this embodiment, motor-generator 2 is a three-phase synchronous rotary machine having a permanent magnet and is electrically connected to electric storage means 14 through inverter 13. Electric storage means 14 may be a secondary battery or a capacitor having large capacity. Inverter 13 is a bidirectional energy converter for converting a D.C. current from electric storage means 14 into a three-phase A.C. current and supplying the A.C. current to motor-generator 2 or for converting a three-phase A.C. current generated by motor-generator 2 into a D.C. current and supplying the D.C. current to electric storage means 14.

Inverter 13 is controlled by program control circuit 15. An input information of program control circuit 15 includes an output information of first rotation sensor 16 for detecting rotation of the motor-generator 2, an output information of second rotation sensor 17 for detecting the rotation of internal combustion engine 1 and a voltage information indicative of a residual electric capacity of electric storage means 14. These information are taken in the program control circuit 15 through an input/output circuit I/O. Further, a driving operation information is taken in program control circuit 15. The driving operation information includes an acceleration information A indicative of a pedaling amount of accelerator pedal 20, a brake information B indicative of a pedaling amount of a brake pedal, a clutch information C indicative of a pedaling amount of a clutch pedal and an information of operation lever 18 indicative of the operating mode. Operation lever 18 is mounted on a panel below a steering wheel similarly to an exhaust brake of the conventional large size vehicle and is operated by a driver. These information are taken in program control circuit 15 through input/output circuits I/O.

As mentioned previously, motor-generator 2 is the synchronous rotary machine including the permanent magnet and functions as the motor when the phase rotation speed of the A.C. current supplied from inverter 13 becomes higher than the rotation speed of the rotary machine to generate the mechanical rotation energy by the electric energy supplied from inverter 13. Motor-generator 2 functions as the generator when the phase rotation speed of the A.C. current supplied from inverter 13 becomes lower than the rotation speed of the rotary machine to generate the electric energy and supply it to electric storage means 14 through inverter 13. Since this control has been well known as the bidirectional control of inverter, the detailed description thereof is omitted.

In this embodiment, internal combustion engine 1 includes starter motor 19, which is necessary to start internal combustion engine 1 since internal combustion engine 1 is connected to motor-generator 2 through unidirectional rotation transmitting means 5, so that it is impossible to start internal combustion engine 1 by motor-generator 2. Starter motor 19 may be operated manually by the driver or under control of program control circuit 15.

In this embodiment, operation lever 18 to be operated by the driver can be set in any of four setting positions including a neutral (OFF) position and three steps in the braking direction (B). The electric braking can be selected by operation lever 18. In the case of the electric braking, the degree of braking (magnitude of braking force) can be selected through three steps by the driver. The selective setting of the running mode is performed not manually by the driving operation but automatically according to the current running mode and the residual capacity of the electric storage means.

This will be described correspondingly to the respective operation modes together with the flow of energy.

Figure 3:
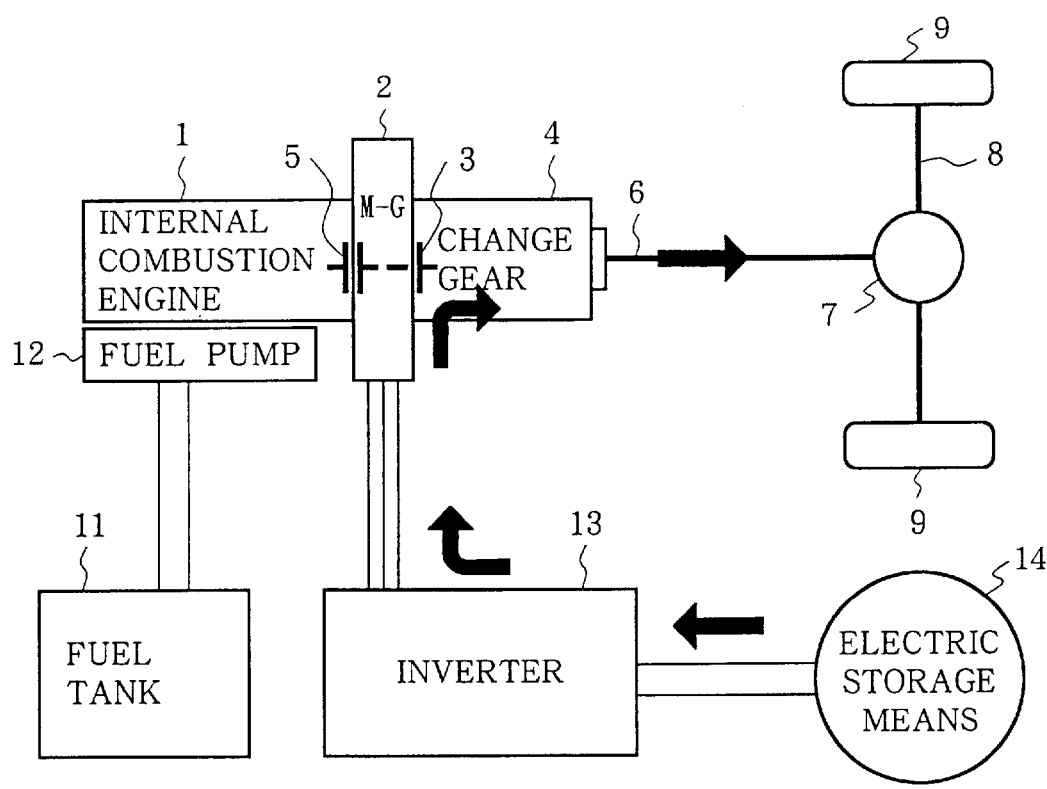
FIG. 3 illustrates a flow of energy in a motor running mode.

FIG. 3 shows the flow of energy in the motor running mode (1). It should be noted that only portions of the hybrid car, which are necessary to explain the flow of energy, are shown in FIG. 3 and the flow of energy is shown by thick arrows. That is, in the motor running mode, motor-generator 2 is controlled such that it works as the motor and electric energy stored in electric storage means 14 is supplied to motor-generator 2 through inverter 13. Motor-generator 2 drives the axle through clutch 3 and change gear 4. In this state, internal combustion engine 1 is stopped or idling at low speed. Therefore, unidirectional rotation transmitting means 5 is in the decoupling state, so that the rotation of internal combustion engine 1 is not transmitted to the rotary shaft of motor-generator 1.

The motor running mode is automatically set at the start time of the vehicle. Frequency of the A.C. current supplied to motor-generator 2 is changed correspondingly to the pedaling amount of the acceleration pedal, so that power generated by motor-generator 2 is changed correspondingly. Further, the motor running mode is also set automatically when the vehicle is steadily running on a flat road at substantially constant speed. This mode can be also set manually by shifting operation lever 18 to the side of the electric acceleration by the driver when the vehicle runs through an area such as a national park in which the exhaust gas limitation is severe.

Figure 4:
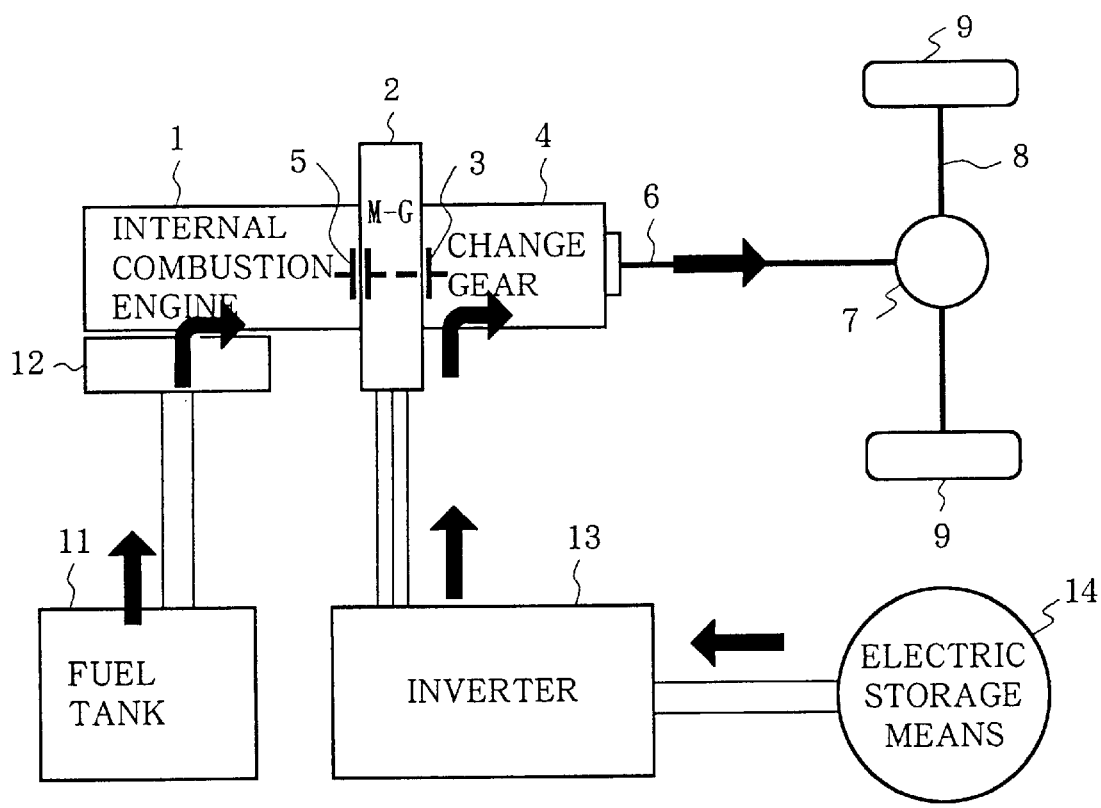
FIG. 4 illustrates a flow of energy in the parallel running mode.

FIG. 4 shows the flow of energy in the parallel running mode (2). In this mode, internal combustion engine 1 rotates by fuel supplied externally. Motor-generator 2 is controlled such that it works as the motor, which is driven by electric energy supplied through inverter 13.

The parallel running mode is automatically selected when the driving force required by the vehicle exceeds a constant value. That is, starter motor 19 is driven under control of program control circuit 15 to start internal combustion engine 1 to operate. Program control circuit 15 controls the vehicle such that the rotation speed of internal combustion engine 1 is increased up to a constant value substantially equal to the rotation speed of motor-generator 2 and, after the rotation speed of internal combustion engine 1 is maintained at the constant value, is synchronized with the rotation speed of motor-generator 2 to set unidirectional rotation transmitting means 5 in the coupling state. Thereafter, the supply amount of fuel supplied to internal combustion engine 1 and the frequency of the A.C. current supplied to motor-generator 2 are controlled simultaneously according to the pedaling amount of the acceleration pedal. So long as a load is exerted on the axle, internal combustion engine 1 works to increase the rotation speed of the drive shaft, so that unidirectional rotation transmitting means 5 is maintained in the coupling state. The parallel running mode is selected when the vehicle mounting a heavy load is started and/or accelerated or when the vehicle runs an uphill road. This mode is also utilized when the vehicle is to be accelerated in a case where the residual capacity of the storage battery means is reduced.

Figure 5:
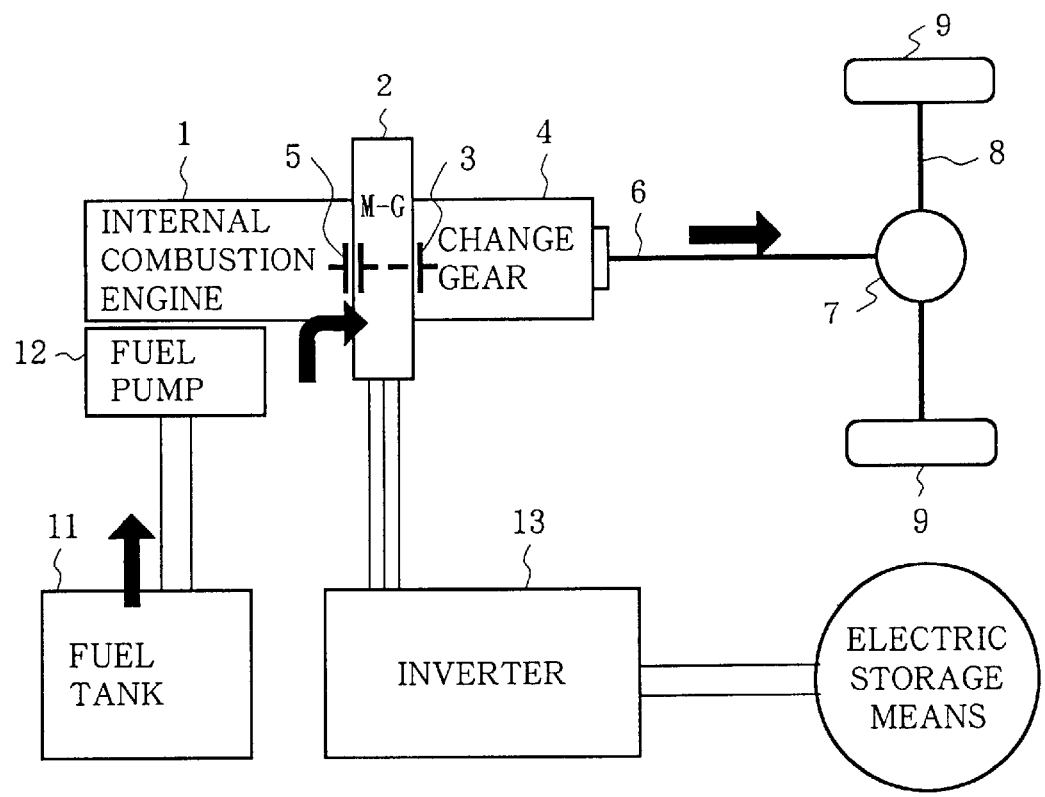
FIG. 5 illustrates a flow of energy in the engine running mode.

FIG. 5 illustrates the flow of energy in the engine running mode (3). In this mode, motor-generator 2 is in the off state and is idling. In this mode, the vehicle operates similarly to a usual car having only an internal combustion engine and the internal combustion engine drives the axle by energy obtained from externally supplied fuel. Since the mass of the rotary member of motor-generator 2 is small, friction thereof is small even when it is idling.

In this engine running mode, change gear 4 is set in any one of the gear positions except the neutral position. That is, when clutch 3 is in the coupling state, unidirectional rotation transmitting means 5 is automatically maintained in the coupling state so long as there is a load on the axle. This mode is selected when the residual capacity of electric storage means 14 becomes minimum.

Figure 6:
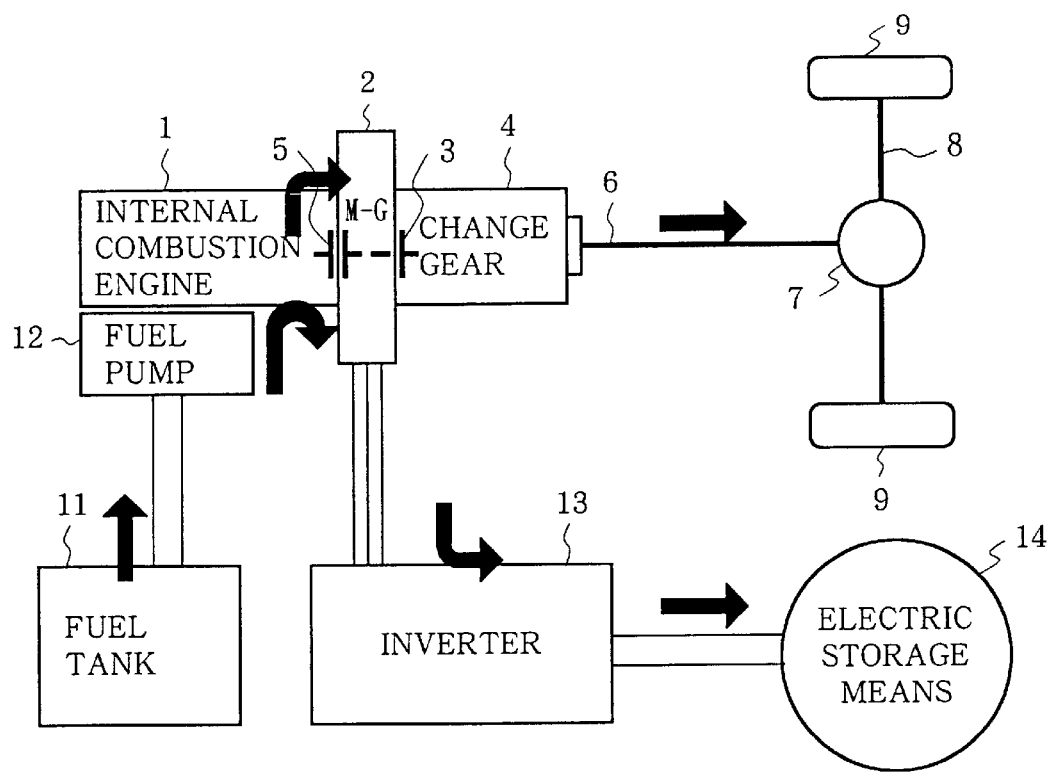
FIG. 6 illustrates a flow of energy in the running/recharging mode.

FIG. 6 shows the flow of energy in the running/recharging mode (4). In this mode, motor-generator 2 is controlled such that it works as a generator and internal combustion engine 1 operates such that it drives both the load on the axle and the load of motor-generator 2. In this mode, energy supplied from fuel is converted into mechanical energy by internal combustion engine 1, with which the axle is driven, and, simultaneously, it is converted into electric energy by the motor-generator 2, with which the electric storage means 14 is recharged.

The running/recharging mode is set when internal combustion engine 1 is operating and accelerator pedal 20 is pressed down. Since both motor-generator 2 and the axle are loaded, unidirectional rotation transmitting means 5 becomes in the coupling state automatically. This mode is set when the residual capacity of the electric storage means becomes small.

Figure 7:
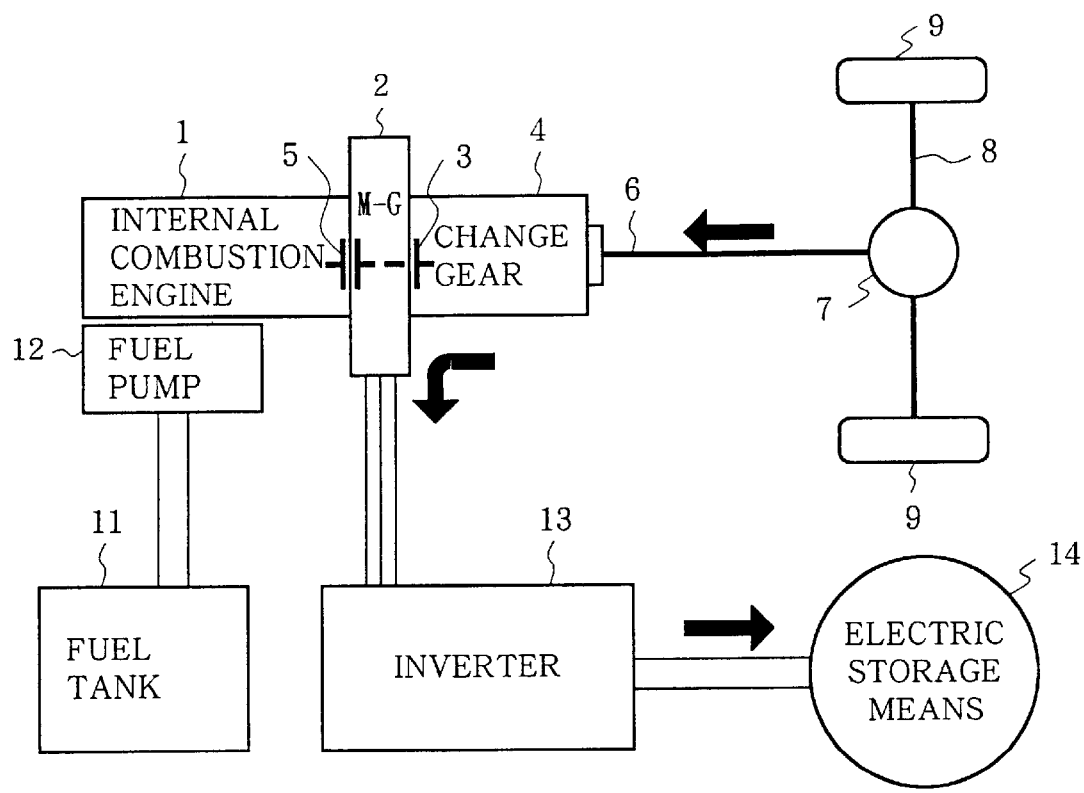
FIG. 7 illustrates a flow of energy in the regenerative mode.

FIG. 7 shows the flow of energy in the regenerative mode (5). In this mode, motor-generator 2 is controlled such that it works as a generator. That is, motor-generator 2 is driven by the axle through change gear 4 and clutch 3 to make the vehicle in the engine braking state and electric energy generated in motor-generator 2 is used to recharge electric storage means 14 through inverter 13.

The regenerative mode is set when operation lever 18 is moved to the side of the electric braking. Alternatively, it may be possible to construct a software of program control circuit 15 such that this mode can be also set when the brake pedal is pressed down in the motor running mode (1). Since, in the regenerative mode, accelerator pedal 20 is basically not pedaled, the rotation speed of internal combustion engine 1 is low or internal combustion engine 1 is not operated and unidirectional rotation transmitting means 5 is automatically set in the decoupling state. Since, in the present invention, the mechanical coupling of internal combustion engine 1 is separated in the regenerative mode, energy generated by the braking is efficiently regenerated without influence of friction of internal combustion engine 1.

Figure 8:
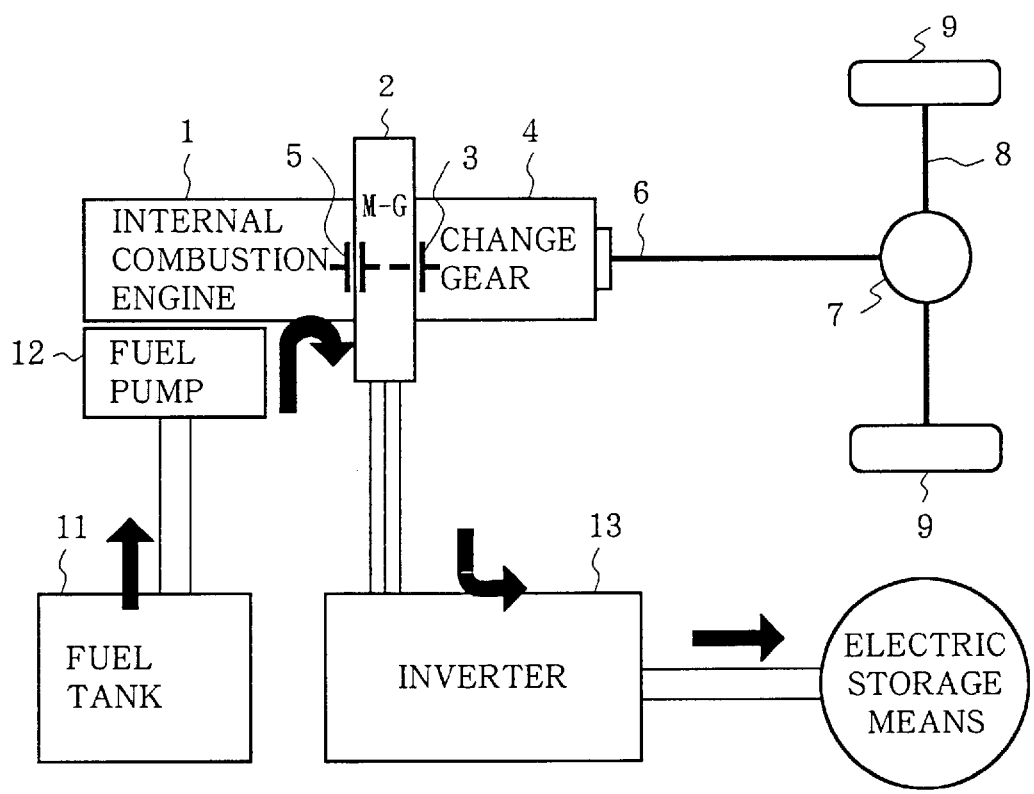
FIG. 8 illustrates a flow of energy in the parking/recharging mode.

FIG. 8 shows the flow of energy in the parking/recharging mode (6). In this mode, motor-generator 2 is controlled such that it works as a generator. Further, change gear 4 is in the neutral position. In this mode, motor-generator 2 is driven by internal combustion engine 1 and electric energy generated by motor-generator 2 is used to recharge electric storage means 14 through inverter 13.

The parking/recharging mode is set when change gear 4 is shifted to the neutral position while the vehicle is parking. For the sake of safety, it is possible to condition this mode when the parking brake is active. This mode is utilized when the residual capacity of electric storage means 14 becomes smaller than a certain limit. In this parking/recharging mode, it is possible to design the software of the control circuit such that the rotation speed, that is, the output of internal combustion engine 1 is automatically set to a state in which the fuel efficiency is acceptable and the exhaust gas condition is acceptable.

As another mode than the above mentioned operation modes, it is possible to provide a recharging device for recharging the electric storage means with using a commercial power source on the vehicle and to recharge electric storage means 14 at any time by connecting the electric storage means to the commercial power source. Alternatively, it is possible to provide such recharging device connected to a commercial power source in a usual parking position of the vehicle such that the electric storage means of the vehicle can be recharged in the parking position.

Now, a driving model of a vehicle, which is driven in the respective driving modes mentioned above, will be described. First, in a state where the vehicle is parking, the vehicle is started by using the motor running mode (1). Then, when the speed of the vehicle reaches a certain value (5~10 Km/hour), the internal combustion engine thereof is started to shift the running mode to the parallel running mode (2). With such scheme, it is possible to reduce noise and undesirable exhaust gas, which are generated at the starting time of the vehicle.

When the speed of the vehicle becomes a standing running speed (40~100 Km/hour), it is possible to select one of the motor running mode (1), the engine running mode (3) and the running/recharging mode (4), according to the residual capacity of the electric storage means. In the case of the uphill driving, it is possible to select the parallel running mode (2). In the case of the downhill driving, the regenerative mode (5) is selected.

When the vehicle is decelerated, it is preferable to select the regenerative mode (5) and to use the service braking by the brake pedal in only a final stoppage of the vehicle.

The hybrid car according to the present invention can utilize the merits of both the conventional series system hybrid car and the conventional parallel system hybrid car. That is, according to the hybrid car of the present invention, it is possible, during an uphill run or a starting time, to increase the torque by driving the axle by both the internal combustion engine and the motor, with substantially improved fuel efficiency. The hybrid car according to the present invention requires only one electric rotary machine, leading to a reduction of weight of the vehicle, so that the fuel efficiency can be improved. According to the hybrid car of the present invention, it is possible to effectively regenerate energy generated by the braking without influence of friction of the internal combustion engine. Further, according to the present invention, the construction of the hybrid car can be simplified without using a second clutch, which has a complicated structure and is heavy weight.

By using a unidirectional clutch, length of the whole engine in the axial direction thereof would become large compared with the conventional hybrid car of the parallel type unless it would be well designed. That is, in the conventional parallel type hybrid car, the rotor of the motor-generator is directly connected to the crank shaft of the internal combustion and the clutch and the change gear are connected to the shaft of the rotor in the order. However, since, in the above mentioned series/parallel system, the unidirectional clutch is required between the internal combustion engine and the motor-generator, in addition to the conventional clutch, the axial length of the whole engine is increased correspondingly. There might be a possibility that the increase of the axial length of the whole engine requires a modification of the cab structure design in the case of the truck and a modification of the design of the structure of the rear engine room in the case of the bus. Such modification might affect the long term record of performance of the car body.

To overcome such a problem, it is preferable to to arrange the unidirectional clutch in an inside space of a rotor of the motor-generator. Such an example will be explained below.

Figure 9:
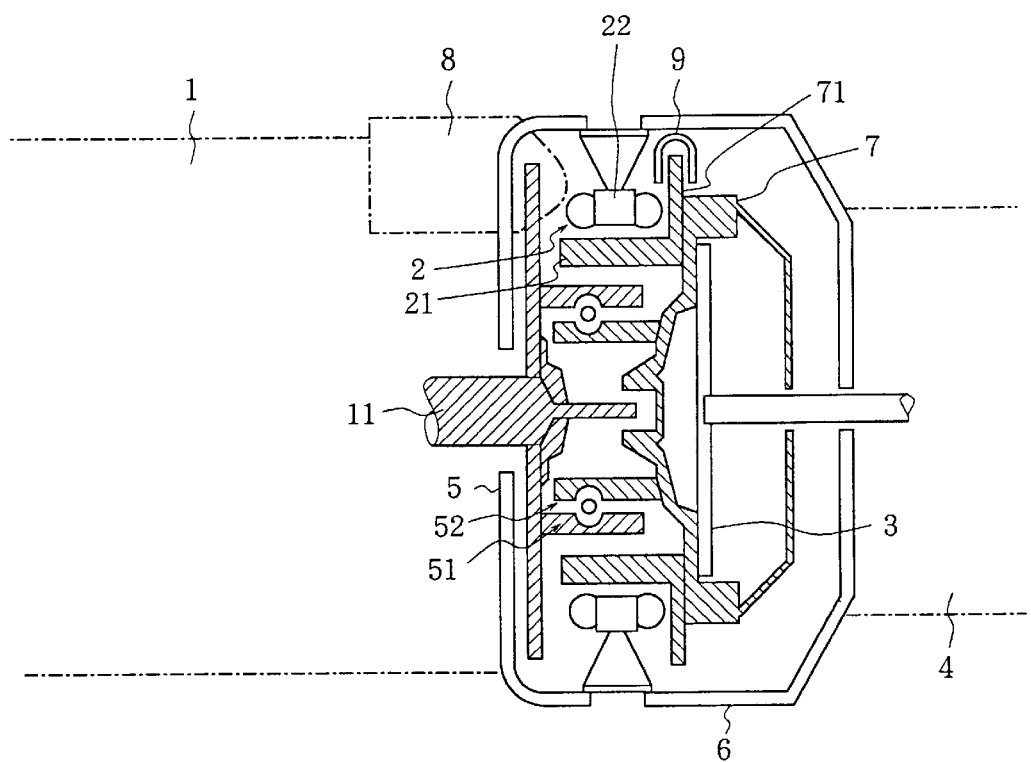
FIG. 9 shows a whole structure of a main portion of a hybrid car according to an embodiment of the present invention.

FIG. 9 is a cross section showing the unidirectional clutch. It should be noted that, in FIG. 9, portions of the hybrid car, which are coupled and decoupled, are shown exaggerated in order to facilitate understanding of an arrangement of respective components and a power transmission structure thereof. Further, bearings, seals, bolts, nuts and other small parts are not shown for simplicity of illustration.

In FIG. 9, the hybrid car includes internal combustion engine 1 shown by chain lines on the left side portion, motor-generator 2, clutch 3, and change gear 4 shown by a chain line on the right side portion. These components are connected such that rotary driving force is transmitted from internal combustion engine 1 in the sequence. Further, unidirectional clutch 5 is provided between internal combustion engine 1 and motor-generator 2. Unidirectional clutch 5 functions to transmit rotary driving force from internal combustion engine 1 to motor-generator 2 while blocking transmission of rotary driving force from motor-generator 2 to internal combustion engine 1. Unidirectional clutch 5 is arranged in a space provided within rotor 21 of motor-generator 2 and stator 22 of motor-generator 2 is arranged in a space surrounding rotor 21.

Figure 1:
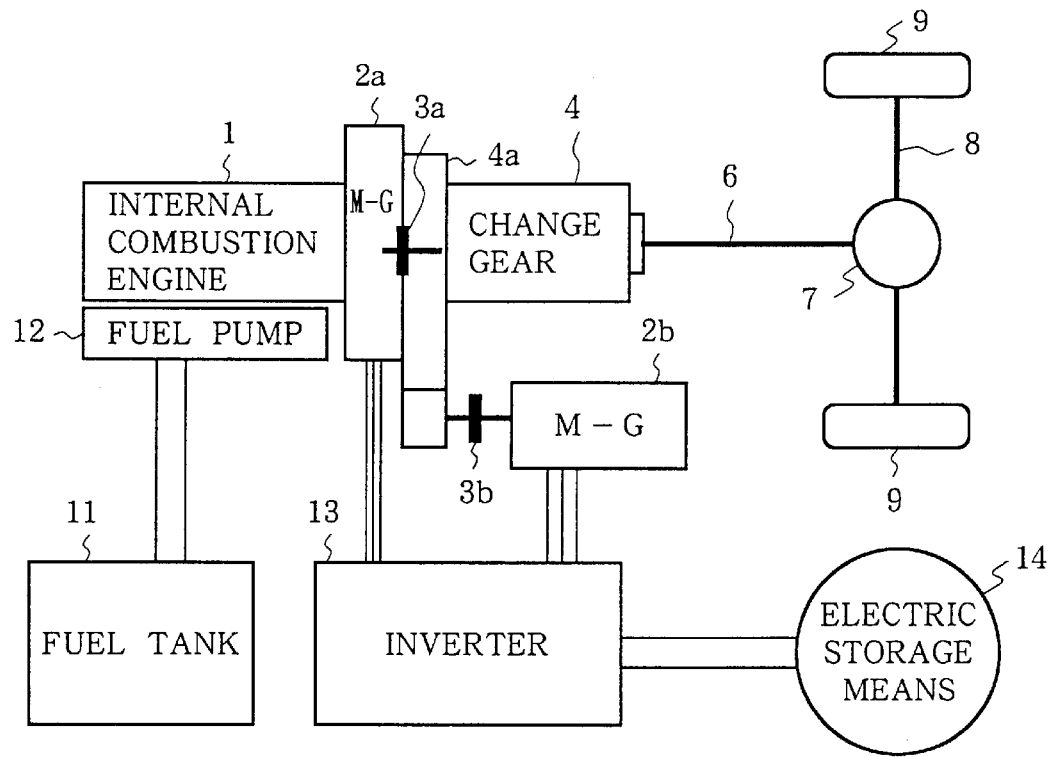
FIG. 1 shows an example of a conventional construction of a hybrid car.

Portions (11 and 51) in FIG. 1, which are hatched by rising lines, rotate together with rotation of crank shaft 11 of internal combustion engine 1 and portions (5, 7, 21 and 71), which are hatched by falling lines, rotate together with rotation of flywheel 7.

Figure 10A:
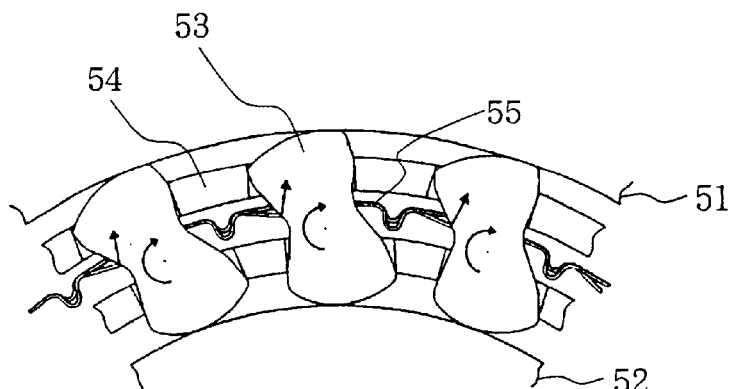
FIGS. 10*a*, 10*b* and 10*c* show a structure of a unidirectional clutch and operations thereof.
Figure 10B:
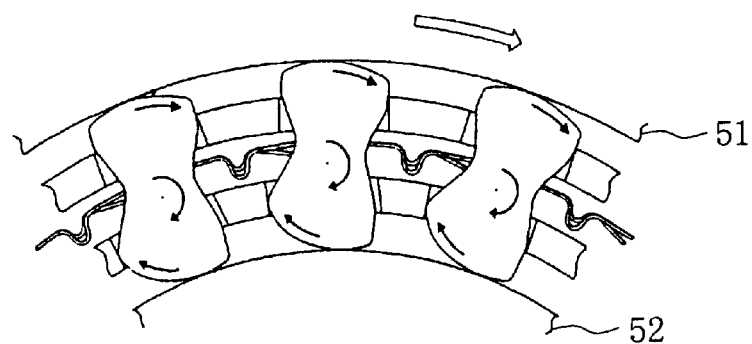
Figure 10C:
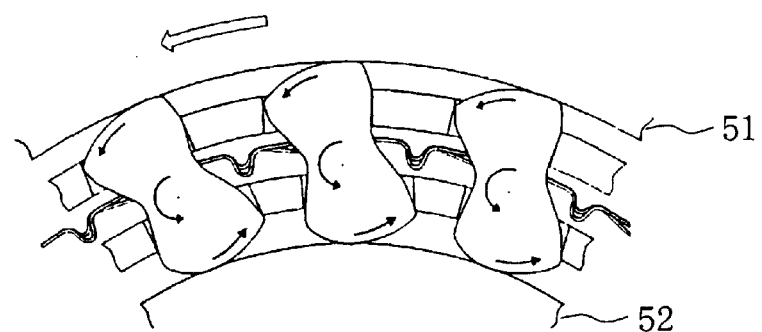

FIGS. 10a, 10b and 10c show a structure of the unidirectional clutch and operations thereof.

FIG. 10a shows a structure of a main portion of the unidirectional clutch 5, in which unidirectional clutch 5 is of the coaxial type including outer ring 51 coupled with a crank shaft of internal combustion engine 1, inner ring 52 coupled with a rotor of motor-generator 2 and a plurality of sprags 53 disposed between the inner and outer rings. Retainer 54 is arranged between adjacent ones of sprags 53 in order to separate the sprags equidistantly. Further, spring 55 is disposed between adjacent sprags 53 as shown in FIG. 10a. Spring 55 biases one of adjacent sprags 53 in a direction shown by an arrow to force one sprag 53 such that the latter is rotated in a direction shown by a rotation arrow.

As shown in FIG. 10b, when outer ring 51 is rotated in a clockwise direction shown by a thick arrow by the crank shaft of internal combustion engine 1, respective sprags 53 are tilted in a clockwise direction due to frictional forces acting between sprags 53 and outer ring 51 and between sprags 53 and inner ring 52 and sprags 53 mesh firmly with outer and inner rings 51, 52, so that the rotation force of outer ring 51 is transmitted to inner ring 52. On the other hand, as shown in FIG. 10c, when outer ring 51 is rotated in a counterclockwise direction with respect to inner ring 52, respective sprags 53 are tilted in a counterclockwise direction due to frictional forces acting between sprags 53 and outer ring 51 and between sprags 53 and inner ring 52 and the meshing relation between sprags 53 and outer and rings 51, 52 is relieved, so that the outer ring runs idle.

Returning to FIG. 9, stator housing 6 housing unidirectional clutch 5 and motor-generator 2 is provided and stator 22 is fixedly connected to an inside surface of stator housing 6.

The rotor 21 of motor-generator 2 is fixedly connected to flywheel 7 housed in stator housing 6. Slit ring 71 formed with a plurality of slits is fixedly connected to flywheel 7 and rotation sensor 9 for emitting and receiving light passed through the slits of slit ring 71 is provided inside stator housing 6.

Figure 11:
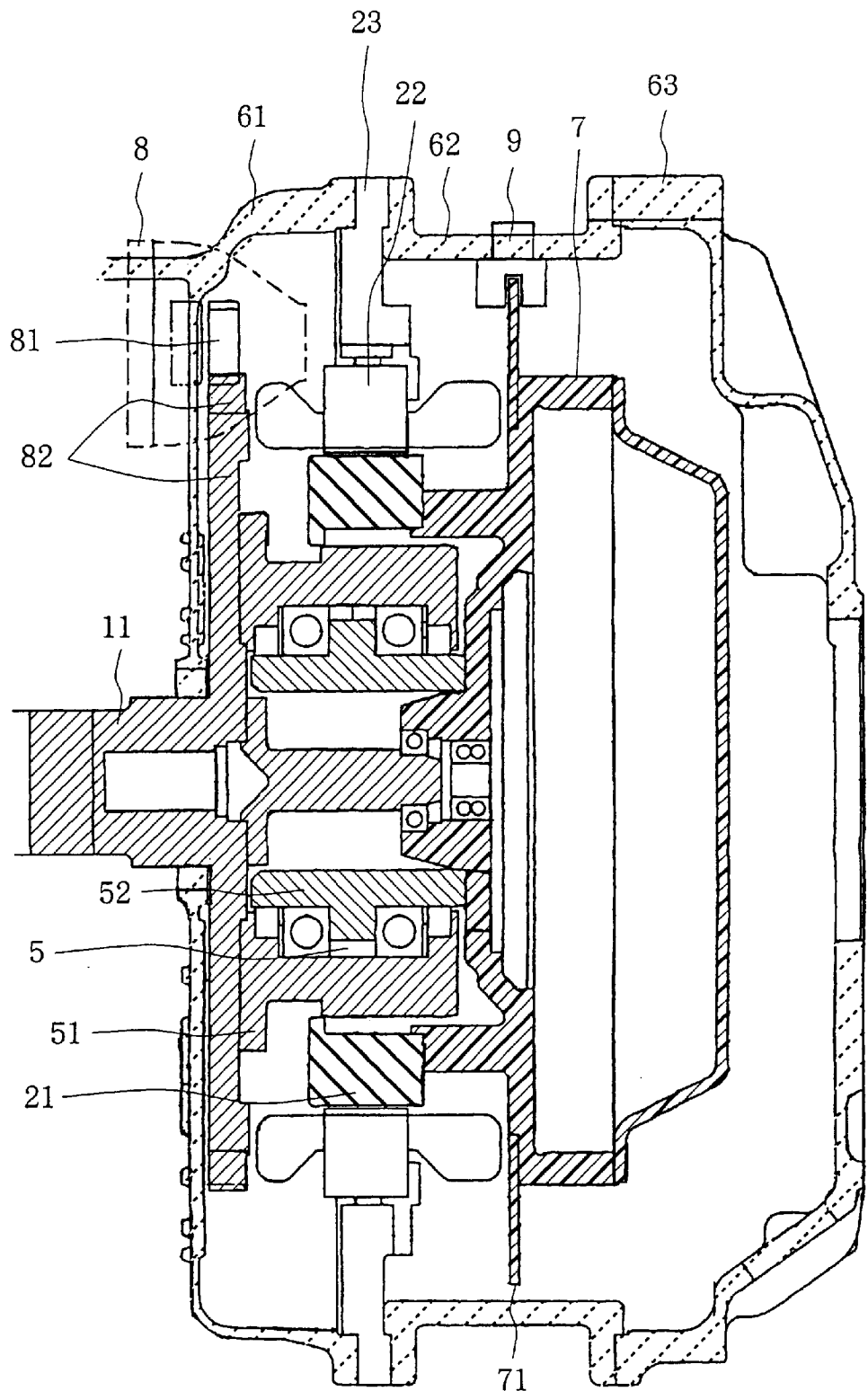
FIG. 11 shows the whole structure in more detail.

FIG. 11 shows the structure shown in FIG. 9 in more detail. It should be noted that this figure includes bolts and bearings, etc., for assembling the structure to disclose the assembling steps in detail. Further, this figure can be used as an assembly drawing. In FIG. 11, detailed description of the components depicted by the same reference numerals as those used in FIG. 9 is omitted. Further, since an internal construction of the clutch portion is well known, detailed description thereof is also omitted.

As is clear from FIG. 11, stator housing 6 in this structure is constructed with first member 61 on which stator 22 of motor-generator 2 is mounted through bracket 23, second member 62 on which rotation sensor 9 is mounted and third member 63 covering flywheel 7, all of which are connected together by bolting. With this structure, it is possible to facilitate an assembling and disassembling operation.

As shown in FIGS. 9 and 11, the structure further includes starter motor 8, which can be connected to ring gear 82 through pinion gear 81. That is, since, in the series/parallel type hybrid car, it is impossible to transmit rotary driving force from motor-generator 2 to internal combustion engine 1 due to the presence of unidirectional clutch 5, motor-generator 2 can not be used to start internal combustion engine 1. Therefore, starter motor 8 similar to that provided for a usual internal combustion engine is required.

As mentioned above, according to the present invention, it is possible to provide a reasonable mounting structure of the unidirectional clutch. That is, it is possible to provide the series/parallel type hybrid car, length of the rotary shaft of the engine portion of which is substantially the same as that of a conventional parallel type hybrid car regardless of the presence of the additional unidirectional clutch. Since the structure of the present invention, which includes the unidirectional clutch additionally, does not require a modification of the design of car body basically, it is possible to utilize any of reliable conventional car bodies as it is. Thus, according to the present invention, it is possible to provide a hybrid car, which can exhibit at the maximum the merit that fuel efficiency can be improved due to the presence of the unidirectional clutch.

Now, the assembling procedures for connecting the motor-generator to the unidirectional clutch will be described.

Figure 12:
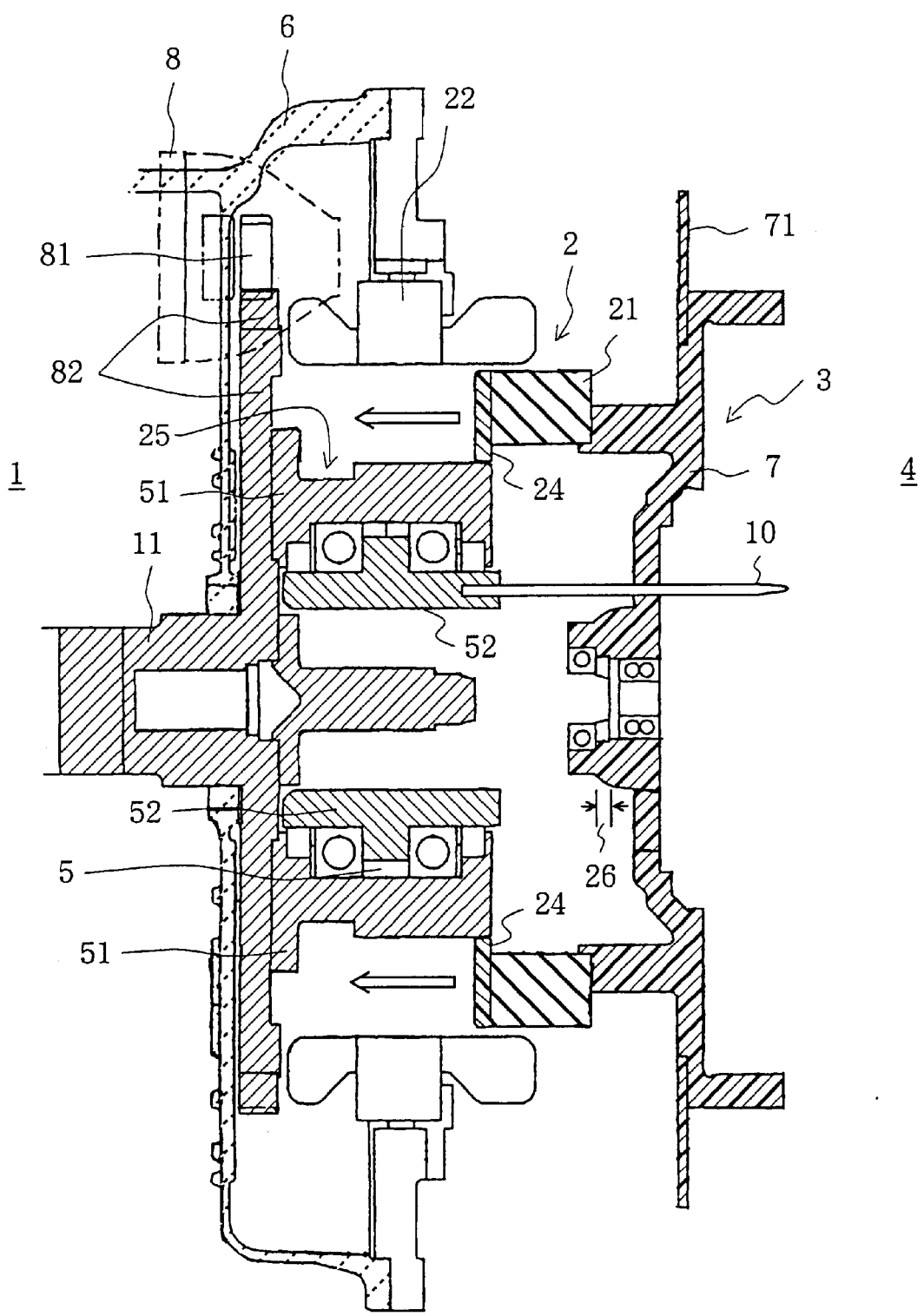
FIG. 12 is a cross section of a portion of the structure in an assembling state.
Figure 13:
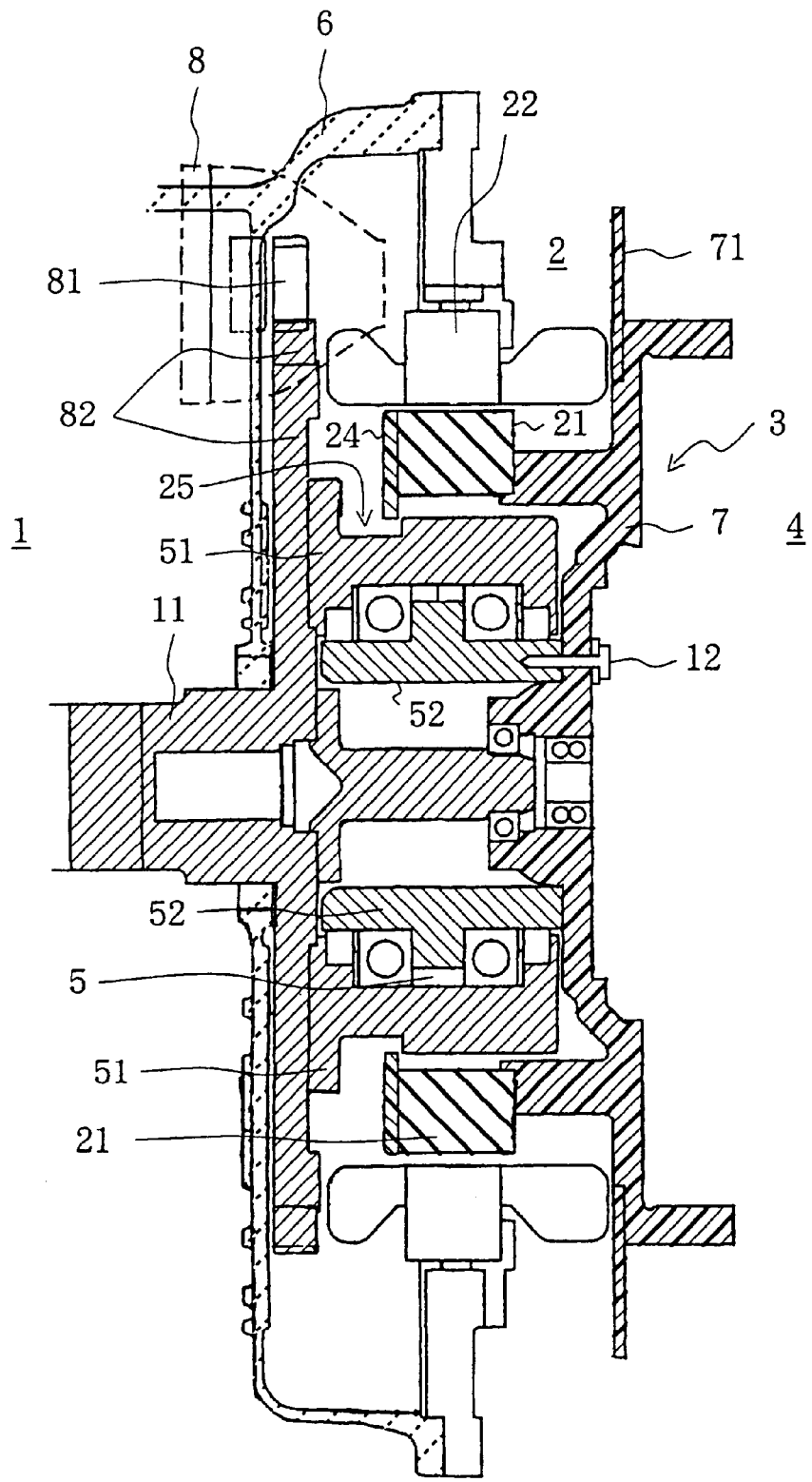
FIG. 13 is a cross section of the portion of the structure including a rotary shaft in the assembling state.

FIGS. 12 and 13 are cross sections of the main structure for explaining the present embodiment, in which FIG. 12 is a cross section of the structure including the rotary shaft in a midway of the assembling step and FIG. 13 is the cross section of the structure including the rotary shaft after the assembling step is over.

A left side portion of FIG. 12 is internal combustion engine 1, which is not shown, and crank shaft 11 thereof is connected thereto. The clutch is arranged in a space depicted by arrow 3 and change gear is mounted on a position depicted by reference numeral 4. In this stage, the clutch and the change gear are not mounted as yet.

Describing a power transmission path of the engine portion including the unidirectional clutch with reference to FIG. 13, unidirectional clutch 5 and motor-generator 2 connected in series with unidirectional clutch 5 are mounted within the power transmission path from crank shaft 11 of internal combustion engine 1 to clutch 3 in series therewith. That is, outer ring 51 of unidirectional clutch 5 is mounted on crank shaft 11 so that outer ring 51 rotates together with rotation of the crank shaft 11 of internal combustion engine 1. Inner ring 52 of unidirectional clutch 5 is mounted on flywheel 7. Further, rotor 21 of motor-generator 2 is mounted on flywheel 7 so that rotor 21 rotates together with inner ring 52 of unidirectional clutch 5. Stator 22 of motor-generator 2 is mounted on housing 6.

Unidirectional clutch 5 functions similarly to the ratchet mechanism to be mounted on the rear wheel of the bicycle and can transmit rotary force from crank shaft 11 to flywheel 7 when the rotating directions thereof are the same while blocking a transmission of rotary force from flywheel 7 to crank shaft 11. That is, rotary force is transmitted from internal combustion engine 1 to the axle when the vehicle is accelerated by internal combustion engine 1. However, in the engine braking where rotary force of the axle is transmitted to the internal combustion engine, that is, when rotation speed of flywheel 7 becomes higher than that of crank shaft 11, unidirectional clutch 5 races, so that rotary force is not transmitted from flywheel 7 to crank shaft 11.

In this state, when motor-generator 2 is operated as a generator under the control of the control circuit, the electric braking by the generator occurs instead of the engine braking. Therefore, electric energy is generated by motor-generator 2 as a generator and the regenerative electric energy is used to recharge the electric storage means. That is, when the vehicle becomes the engine braking state, energy generated by the braking is not dissipated by friction of the internal combustion engine but converted into electric energy efficiently by motor-generator 2 without influence of the friction of the internal combustion engine. When the vehicle runs by using only motor-generator 2 operating as the motor, it is possible to exclude the influence of friction of the internal combustion engine by turning the engine switch off to completely stop the internal combustion engine.

Describing the assembling procedures of the present invention with reference to FIG. 12, the shown state corresponds to a step where outer ring 51 of unidirectional clutch 5 is already mounted on crank shaft 11 protruding from the side of the internal combustion engine and rotor 21 of motor-generator 2 mounted on flywheel 7 is going to be inserted into a space defined between outer ring 51 of unidirectional clutch 5 and stator 22 of motor-generator 2. Ring-shaped guide member 24 of non-magnetic material such as stainless steal is provided on an end portion of rotor 21 and rotor 21 is pushed into the space in the direction shown by thick arrows while ring guide member 24 slides on and along the surface of outer ring 51.

In this state, a radial gap between stator 22 and rotor 22 of motor-generator 2 is about 1 mm and the opposing surfaces thereof are machined with high precision. Therefore, if an axis of rotor 21 were inconsistent with an axis of crank shaft 11, rotor 21 could be in contact with the surface of stator 22, so that the finely machined surface thereof might be damaged. Further, since both stator 22 and rotor 21 are of magnetic material and rotor 21 is magnetized, it is difficult to easily separate them if they are once in contact. Therefore, in order to separate them in such case, the finely machined surfaces thereof may be scratched.

In order to prevent such phenomenon, a plurality of guide pins 10 are utilized in the present invention as shown in FIG. 12. That is, guide pins 10 extending in parallel to the rotary shaft are implanted on inner ring 52 of unidirectional clutch 5. A corresponding number of female-threaded tap holes are formed in inner ring 52 of unidirectional clutch 5 and a male-threaded end portion of each of guide pin 10 is screwed into each of the tap holes tightly. A corresponding number of through-holes are formed in flywheel 7 in positions corresponding to respective guide pins 10, so that guide pins 10 pass through the through-holes when rotor 21 is inserted into the annular space defined by outer ring 51 and stator 22. In the step shown in FIG. 4, the guide pins 10 supports total weight of the flywheel 7 and the rotor 21 of the motor-generator substantially. Although only one guide pin 10 is shown in FIG. 12, nine guide pins are implanted on and along a coaxial circular line in this embodiment.

A bearing mechanism is provided in a center boss portion of flywheel 7 for rotatably supporting crank shaft 11 and inner ring 52 of unidirectional clutch 5 is fitted on an outer periphery of the center boss portion, when the unidirectional clutch is assembled. As shown in FIG. 12, portion 26 of the outer periphery of the center boss portion of flywheel 7, which becomes in contact with an inside portion of inner ring 52 immediately before flywheel 7 reaches its predetermined position, is tapered to form a faucet joint structure when assembled.

Further, annular recess 25 is formed on an outer periphery of outer ring 51 of unidirectional clutch 5, for receiving ring-shaped guide 24, which is separated from the end portion of rotor 21 when rotor 21 reaches a designed position.

With this structure, flywheel 7 in the state shown in FIG. 12 is pushed to a direction shown by the thick arrows. Therefore, the surfaces of rotor 21 and stator 22 are not contact with each other until flywheel 7 reaches the position shown in FIG. 13 and, when flywheel 7 reaches the designed position, inner ring 52 of unidirectional clutch 5 is fitted on the boss of flywheel 7. Thereafter, ring guide 24 is separated by recess 25, so that ring guide 24 is not in contact with outer ring 51 of unidirectional clutch 5.

After flywheel 7 and rotor 21 reach the respective designed positions, guide pins 10 are removed and, instead, bolts 12 are screwed in the tap holes, resulting in that flywheel 7 is fixed to inner ring 52 of unidirectional clutch 5. Guide pins 10 can be used repeatedly as a kind of assembling tool.

As described hereinbefore, it is possible to perform a rational assembling of the motor-generator ganged with the unidirectional clutch. According to this assembling method, it becomes possible to reduce the number of assembling steps in a case of mass production, to perform the assembling with which the assembling can be performed stably and repeatedly and to reduce defects occurring in the assembling steps. Further, extra materials are not required in the manufacturing steps and electric performance of the product is not restricted by the assembling works.

What is claimed is:

1. A hybrid car including an internal combustion engine, a motor-generator, a clutch and a change gear, all of which are connected in the sequence to transmit a rotary driving force in the sequence, said hybrid car comprising:

unidirectional rotation transmitting means provided between said internal combustion engine and said motor-generator, said unidirectional rotation transmitting means being adapted to transmit a rotary driving force generated by said internal combustion engine to said motor-generator and to block a transmission of a rotary driving force generated by said motor-generator to said internal combustion engine, wherein said unidirectional rotation transmitting means is a unidirectional clutch, and wherein said unidirectional clutch is disposed in a space defined in a rotor of said motor-generator and a stator of said motor-generator is disposed in an outer peripheral space of said rotor, said hybrid car further comprising a stator housing for housing said unidirectional clutch and said motor-generator, wherein said stator of said motor-generator is fixedly secured to an inside of said stator housing, and a flywheel housed in said stator housing and fixedly secured to said rotor of said motor-generator, a slit ring formed with a plurality of slits and fixedly secured to said flywheel and a rotation sensor provided inside said stator housing, for transmitting and receiving light passed through said slits of said slit ring.

2. A hybrid car as claimed in claim 1, wherein said stator housing includes a first piece on which said stator of said motor-generator is mounted and a second piece on which said rotation sensor is mounted.

3. A hybrid car as claimed in claim 1, further comprising:

control means for controlling said motor-generator; and electric storage means connected to said motor-generator through said control means, wherein said control means comprises:

means for setting any one of the following modes:
(1) a motor running mode in which said motor-generator is operated as a motor to drive an axle through said change gear;
(2) a parallel running mode in which said motor-generator is operated as said motor and said axle is driven by both said motor and said internal combustion engine through said change gear;
(3) an engine running mode in which said motor-generator races and said axle is driven by said internal combustion engine through said change gear;
(4) a running/recharging mode in which said motor-generator is operated as a generator and said axle is driven by said internal combustion engine through said motor-generator and said change gear and, simultaneously, said electric storage means is recharged by electric energy generated by said generator;
(5) a regenerative mode in which said motor-generator is operated as said generator and said generator is driven by said change gear to recharge said electric storage means by electric energy generated by said generator; and
(6) a parking/recharging mode in which said motor-generator is operated as said generator and said generator is driven by said internal combustion engine to recharge said electric storage means by electric energy generated by said generator.

4. A hybrid car as claimed in claim 3, wherein said motor-generator is a synchronous rotary machine having a permanent magnet and said control means comprises:

a bidirectional inverter for converting a multi-phase A.C. output of said synchronous rotary machine into a D.C. current and supplying the D.C. current to said electric storage means and for converting an output D.C. current of said electric storage means into a multi-phase A.C. output and supplying the multi-phase A.C. output to said synchronous rotary machine;

a first rotation sensor for detecting rotation of said motor-generator;

a second rotation sensor for detecting rotation of said internal combustion engine; and a program control circuit responsive to outputs of said first and second rotation sensors for monitoring an operation of said unidirectional rotation transmitting means and controlling the A.C. frequency of said bidirectional inverter.

* * * * *